(12) United States Patent
Singh et al.

(10) Patent No.: US 9,952,897 B2
(45) Date of Patent: Apr. 24, 2018

(54) MANAGING PROCESSES WITHIN SUSPEND STATES AND EXECUTION STATES

(75) Inventors: Neeraj Kumar Singh, Seattle, WA (US); Hari Pulapaka, Redmond, WA (US); Arun Kishan, Kirkland, WA (US); James A. Schwartz, Jr., Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 507 days.

(21) Appl. No.: 13/230,677

(22) Filed: Sep. 12, 2011

(65) Prior Publication Data

US 2013/0067495 A1    Mar. 14, 2013

(51) Int. Cl.
  *G06F 3/00*      (2006.01)
  *G06F 9/44*      (2006.01)
  *G06F 9/46*      (2006.01)
  *G06F 13/00*     (2006.01)
  *G06F 9/48*      (2006.01)

(52) U.S. Cl.
  CPC ............ *G06F 9/485* (2013.01); *Y02B 60/144* (2013.01)

(58) Field of Classification Search
  None
  See application file for complete search history.

(56) References Cited

U.S. PATENT DOCUMENTS 5,428,790 A * 6/1995 Harper ................. G06F 1/3203
                                                     713/322
6,148,408 A   11/2000 Shimoda
6,260,150 B1   7/2001 Diepstraten
(Continued)

FOREIGN PATENT DOCUMENTS

CN    1801096 A     7/2006
CN    101281480 A   10/2008
(Continued)

OTHER PUBLICATIONS

Non-Final Office Action cited in U.S. Appl. No. 13/230,698 dated Dec. 12, 2012, 26 pgs.
(Continued)

*Primary Examiner* — Tuan Dao
*Assistant Examiner* — William C Wood
(74) *Attorney, Agent, or Firm* — Arent Fox LLP

(57) ABSTRACT

One or more techniques and/or systems are provided for suspending logically related processes associated with an application, determining whether to resume a suspended process based upon one or more wake policies, and/or managing an application state of an application, such as timer and/or system message data. That is, logically related processes associated with an application, such as child processes, may be identified and suspended based upon logical relationships between the processes (e.g., a logical container hierarchy may be traversed to identify logically related processes). A suspended process may be resumed based upon a set of wake policies. For example, a suspended process may be resumed based upon an inter-process communication call policy that may be triggered by an application attempting to communicate with the suspended process. Application data may be managed while an application is suspended so that the application may be resumed in a current and/or relevant state.

30 Claims, 12 Drawing Sheets

(56) References Cited

U.S. PATENT DOCUMENTS

| | | | |
|---|---|---|---|
| 6,834,386 B1 | 12/2004 | Douceur | |
| 7,584,376 B2 | 9/2009 | Finkelstein | |
| 7,853,812 B2 | 12/2010 | McBrearty | |
| 7,861,024 B2 | 12/2010 | White et al. | |
| 7,865,844 B2* | 1/2011 | Lahiri | 715/854 |
| 8,490,075 B2* | 7/2013 | Waris et al. | 717/169 |
| 2001/0018717 A1 | 8/2001 | Shimotono | |
| 2002/0059357 A1 | 5/2002 | Ho et al. | |
| 2004/0192357 A1 | 9/2004 | Lin et al. | |
| 2005/0097553 A1 | 5/2005 | Smith et al. | |
| 2005/0155011 A1* | 7/2005 | Heik et al. | 717/100 |
| 2005/0172297 A1* | 8/2005 | Garcia | G06F 11/1438 719/310 |
| 2006/0225107 A1 | 10/2006 | Seetharaman et al. | |
| 2006/0236390 A1 | 10/2006 | Matovsky et al. | |
| 2006/0248404 A1 | 11/2006 | Lindsay et al. | |
| 2006/0294407 A1* | 12/2006 | Rothman | G06F 1/3203 713/320 |
| 2007/0028052 A1 | 2/2007 | Armstrong et al. | |
| 2007/0245163 A1 | 10/2007 | Lu | |
| 2007/0297416 A1 | 12/2007 | Boley et al. | |
| 2008/0059842 A1 | 3/2008 | Kadkade et al. | |
| 2008/0184274 A1 | 7/2008 | Ohta et al. | |
| 2008/0189708 A1 | 8/2008 | Cheng et al. | |
| 2008/0263619 A1 | 10/2008 | Auwens | |
| 2009/0011791 A1 | 1/2009 | Tashiro | |
| 2009/0113433 A1 | 4/2009 | Dunshea et al. | |
| 2009/0113444 A1 | 4/2009 | Hackborn et al. | |
| 2009/0187394 A1* | 7/2009 | Lin et al. | 703/14 |
| 2009/0293062 A1 | 11/2009 | Amir et al. | |
| 2009/0295746 A1 | 12/2009 | Davidson | |
| 2009/0307696 A1 | 12/2009 | Vals | |
| 2010/0023788 A1 | 1/2010 | Scott | |
| 2010/0088495 A1* | 4/2010 | Anderson et al. | 712/229 |
| 2010/0122077 A1 | 5/2010 | Durham | |
| 2010/0138641 A1 | 6/2010 | Chang | |
| 2010/0217968 A1 | 8/2010 | Estroff et al. | |
| 2010/0218015 A1 | 8/2010 | Yarak | |
| 2010/0250908 A1 | 9/2010 | Amann et al. | |
| 2010/0313208 A1 | 12/2010 | Zarzycki et al. | |
| 2011/0126185 A1 | 5/2011 | Waris et al. | |
| 2011/0131558 A1 | 6/2011 | Young et al. | |
| 2011/0213992 A1 | 9/2011 | Satsangi et al. | |
| 2012/0054478 A1 | 3/2012 | Curtis et al. | |

FOREIGN PATENT DOCUMENTS

| | | | | |
|---|---|---|---|---|
| EP | 2352089 A1 * | 8/2011 | | G06F 9/542 |
| KR | 1020080086757 A | 9/2008 | | |
| WO | WO0163401 A2 | 8/2001 | | |

OTHER PUBLICATIONS

Reply Non-Final Office Action cited in U.S. Appl. No. 13/230,698 dated Mar. 12, 2012, 16 pgs.
Final Office Action cited in U.S. Appl. No. 13/230,698 dated Apr. 1, 2013, 34 pgs.
Reply Final Office Action cited in U.S. Appl. No. 13/230,698 dated Jul. 1, 2013, 18 pgs.
Non-Final Office Action cited in U.S. Appl. No. 13/230,714 dated Mar. 1, 2013, 39 pgs.
Reply Non-Final Office Action cited in U.S. Appl. No. 13/230,714 dated Jun. 3, 2013, 16 pgs.
Int. Search Report cited in PCT Application No. PCT/US2011/055692 dated Sep. 26, 2012, 9 pgs.
Int. Search Report cited in PCT Application No. PCT/US2011/055696 dated Sep. 10, 2012, 12 pgs.
Int. Search Report cited in PCT Application No. PCT/US2011/055826 dated Sep. 24, 2012, 9 pgs.
"CPU Scheduling in Multimedia Operating Systems", Daniel Alexander Taranovsky, 1999, Research Report, 27 pgs.
"How to: Use the Threads Window"—Retrieved Date: Aug. 23, 2011, http://msdn.microsoft.com/en-us/library/w15yf86f.aspx.
Dedhia, Sandip, "Easily Suspend & Resume Processes with Process Freezer"—Published Date: Nov. 22, 2009, http://www.blogsdna.com/5742/easily-suspend-resume-processes-with-process-freezer.htm.
Chang; et al., "Implementation and Optimization of DSP Suspend Resume on Dual-Core SOC", Published Date: May 25-27, 2009, pp. 185-190, Proceedings: ICESS '09, http://ieeexplore.ieee.org/stamp/stamp.jsp?tp=&arnumber=5066647.
Reply Final Office Action cited in U.S. Appl. No. 13/230,698 dated Jul. 1, 2013, 17 pgs.
Non-Final Office Action cited in U.S. Appl. No. 13/230,698 dated May 9, 2014, 40 pgs.
Notice of Allowance cited in U.S. Appl. No. 13/230,714 dated Aug. 20, 2013, 32 pgs.
Amendment after Notice of Allowance cited in U.S. Appl. No. 13/230,717 dated Nov. 20, 2014, 8 pgs.
Int. Preliminary Report cited in PCT Application No. PCT/US2011/055692 dated Mar. 12, 2014, 5 pgs.
Chinese Office Action cited in Chinese Application No. 201210335484.6 dated May 30, 2014, 4 pgs.
Int. Preliminary Report cited in PCT Application No. PCT/US2011/055696 dated Mar. 12, 2014, 5 pgs.
Int. Preliminary Report cited in PCT Application No. PCT/US2011/055826 dated Mar. 12, 3014, 5 pgs.
Chinese Office Action cited in Chinese Application No. 201210335902.1 dated May 30, 2014, 4 pgs.
Reply Non-Final Office Action cited in U.S. Appl. No. 13/230,698 dated Nov. 10, 2014, 13 pgs.
Final Office Action cited in U.S. Appl. No. 13/230,698 dated Mar. 6, 2015, 44 pgs.
First Chinese Office Action cited in Chinese Application No. 201210335883.2 dated Oct. 23, 2014, 6 pgs.
Reply first Chinese Office Action cited in Chinese Application No. 201210335883.2 dated Feb. 11, 2015, 5 pgs.
Reply first Chinese Office Action cited in Chinese Application No. 201210335902.1 dated Oct. 14, 2014, 3 pgs.
Reply second Chinese Office Action cited in Chinese Application No. 201210335902.1 dated Feb. 16, 2015, 3 pgs.
Chinese Notice of Allowance cited in Chinese Application No. 201210335902.1 dated Apr. 27, 20154, 2 pgs.
"Second Office Action Issued in Chinese Patent Application No. 201210335902.1", dated Dec. 19, 2014, 8 Pages.
McKusick, et al., "Process Management", In Book The Design and Implementation of the 4.4BSD Operating System—Chapter 2 Design Overview of 4.4BSD, Apr. 30, 1996, 2 Pages.
Quintana, David, "Mobile Multitasking", Retrieved from <http://davidquintana.com/entry/mobile-multitasking/>>, Apr. 14, 2010, 6 Pages.
"Supplementary Search Report Issued in European Patent Application No. 11872484.8", dated May 20, 2016, 7 Pages.

* cited by examiner

MANAGING PROCESSES WITHIN SUSPEND STATES AND EXECUTION STATES

BACKGROUND

Many computing devices, such as desktops, laptops, smart phones, and tablets, are developed around conserving power consumption, improving device and application startup latency, and improving overall responsiveness. For example, when a device is not used for some time, such as ten minutes, the device may be placed into a sleep state that may significantly reduce application activity, and thus may result in improved power consumption. When a user subsequently attempts to use the device, the device is awakened from this sleep state to afford the user with the full capabilities of the device.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Among other things, one or more systems and/or techniques for suspending one or more processes associated with an application, determining whether to resume a suspended process based upon one or more wake policies, and/or managing an application state of an application are disclosed herein.

A computing environment may host applications that are associated with processes, which may be executed by one or more processors as threads. It may be appreciated that one or more systems and/or methods described herein may be applicable to applications, process, and/or threads (e.g., since processes are made up of threads which run code on one more processors, the techniques and/or systems mentioned herein are applied equally to threads). Because the computing environment may host a plurality of applications and/or processes, a logical container hierarchy may be implemented to manage such applications and/or processes. In particular, applications may be assigned to logical containers, such as a root logical container, within the logical container hierarchy. Similarly, processes may be assigned to logical containers. The logical container hierarchy may allow for hierarchical nesting of related applications, processes, and/or logical containers. For example, a text editor application (e.g., a parent application/process) may be assigned to a root logical container. The text editor application may be associated with one or more child processes, such as a text editor print process, a text editor save process, and/or a spell checker process. Accordingly, the text editor print process, the text editor save process, and/or the spell checker process may, for example, may be assigned to logical containers associated with (e.g., nested within) the root logical container assigned to the text editor application. In this way, an association (e.g., relationship) between the text editor application and/or child processes may be identifiable.

In one example of suspending one or more processes associated with an application as provided herein, a notification that an application is inactive may be received (e.g., the application may not be visible to a user, the user may not have interacted with the application within a predetermined time, the application may be in a background state, etc.). One or more processes associated with the application may be identified. In one example, a logical container hierarchy may be consulted to identify the one or more processes. For example, a root logical container assigned to the application may be identified. A first process assigned to a first logical container associated with (e.g., nested within) the root logical container may be identified. A second process assigned to the first logical container associated with (e.g., nested within) the root logical container may be identified. A third process assigned to a second logical container associated with (e.g., nested within) the first logical container may be identified. In this way, the first, second, and third process may be identified as being associated with the application. It may be appreciated that a variety of processes and/or applications may be identified as being associated with the application. The one or more processes associated with the application may be placed into a suspend state to conserve power consumption by rendering the suspended processes ineligible for processor execution scheduling. Once suspended, newly created threads and/or processes associated with the suspended application (e.g., newly created processes assigned to logical containers nested within the root logical container) may be suspended to maintain suspension consistency across processes associated with the suspended application. In this way, processes currently associated with the application and/or newly created processes may be identified as being associated with the application, and may be suspended accordingly. It may be appreciated that suspension of one or more processes as provided herein may occur when the device is or is not in a sleep mode, but where one or more applications are inactive or not being used. Thus, power may be conserved and/or battery life extended even when a device is in use.

In one example of determining whether to resume a suspended process as provided herein, a set of wake policies associated with a suspended process may be maintained. A wake policy may be indicative of a reason to resume the suspended process into an execution state. In one example, a wake policy may correspond to a situation where a requesting application sends an inter-process communication call to a suspended process. In another example, a wake policy may correspond to a situation where a suspended application associated with the suspended process is transitioned into a foreground state. In another example, a wake policy may correspond to a situation where user input associated with the suspended application is detected. It may be appreciated that a wake policy may correspond to a variety of situations and/or reasons to wake the suspended process. The wake policy may be associated with a counter indicative of a number of wake notifications (e.g., a notification that an event associated with a wake policy has occurred, such as a requesting application sending inter-process communication to the suspended process) associated with the wake policy that are currently pending for the suspended process. The counter may be incremented (e.g., an event associated with a wake notification may be pending) and/or decremented (e.g., an event associated with a wake notification may be completed). For example, a counter for an inter-process communication wake policy may be incremented to 1 upon receiving a first wake notification that a spreadsheet application sent an inter-process communication call to a suspended text editor. The counter for the inter-process communication wake policy may be incremented to 2 upon receiving a second wake notification that a browser application sent an inter-process communication call to the suspended text editor.

The set of wake policies may be evaluated to determine whether to place the suspended process into an execution state or retain the suspended process in the suspend state. In one example, the suspended process may be placed into the execution state based upon determining at least one counter associated with a wake policy comprises a value above a threshold value (e.g., at least one counter has a value above 2). In another example, values of one or more counters may be aggregated together to create an aggregated value (e.g., three counters associated with various wake policies may have a value of 1, and thus an aggregated value of 3 may be determined). The aggregated value may be adjusted based upon weights associated with the wake policies (e.g., a wake policy associated with user input may receive a weight value of 2, while a wake policy associated with a remote third party request may receive a weight value of 0.5 because it may be more advantageous to respond aggressively to a user as opposed to a remote third party). Likewise a particular counter may be unconditionally observed (e.g., a user counter), whereas another counter may be conditionally observed (e.g., based on frequency, noisiness, source, etc.). If the suspended process is placed into the execution state as an executing application, then a current state of the wake policies and/or a time elapsed since completion of a wake notification may be evaluated in determining whether and/or when to place the executing process back into the suspend state. For example, the executing process may be retained in the execution state for a period of time in the event additional inter-process communication calls are performed. As an optimization, the notifications may be delivered on "edge" transitions (0→1, 1→0) for a particular counter. In the first case, the policy for execution is evaluated and in the second case the policy for suspension is evaluated.

It may be appreciated that in one example, the set of wake policies may be associated with a logical container assigned to the suspended process within a logical container hierarchy. Accordingly, if the suspended process is placed into the execution state, then one or more processes and/or applications associated with the suspended process (e.g., processes assigned to logical containers associated with a logical container assigned to the suspended process) may be placed into the execution state.

In one example of managing an application state as provided herein, a list of timers associated with an application may be maintained. For example, absolute timers (e.g., a timeout set of 2:00 PM 8/31/11), relative timers (e.g., a timeout set at 10 minutes), and/or other types of timers may be maintained. Upon receiving a notification that the application is to be suspended, an application state comprising timer rebasing data derived from the list of timers may be created. The application state may be created because certain timers, such as relative timers, may timeout while the application is suspended even though the underlying reason for the timer has not occurred. For example, a text editor application may set a relative timer of 10 minutes for a spell checker process because the spell checker process generally does not take more than 10 minutes to complete unless an error has occurred. However, the spell checker process may be suspended after 2 minutes from the creation of the relative timer, and may be suspended for 15 minutes. Without adjusting the relative timer, the relative timer may timeout (e.g., the timeout may be incorrect because the timeout is not related to an error of the spell checker, but merely a suspension of the spell checker). Because the spell checker has not erred, but is merely suspended, the relative timer may be rebased using relative timer rebasing data, such as a time till expiration value, within the application state (e.g., the application state may comprise relative timer rebasing data comprising a time till expiration value indicating a time span from when the relative timer is suspended to an original expiration time of the relative timer). Additionally, relative timers may be adjusted so that upon resumption of a suspended application, an abundance of timer expirations do not occur that may otherwise cause unnecessary CPU consumption and/or may detract from user experience. In contrast, absolute timers may be associated with an absolute time (e.g., an original expiration time), such that an application may desire to be notified when the absolute time occurs regardless of whether an application associated with the timer was suspended. Accordingly, the absolute timer may be rebased using absolute timer rebasing data, such as an original expiration time, within the application state (e.g., the application state may comprise absolute timer rebasing data comprising the original expiration time). In this way, the application state comprising timer rebasing data may be used for rebasing timers upon resumption of the application from the suspend state back into the execution state.

In another example of managing an application state as provided herein, an application message queue associated with an application may be maintained while the application is in a suspend state. The application message queue may be configured to store system messages for the application (e.g., system messages associated with settings within a control panel). For example, an operating system of a tablet device may queue system messages for a text editor, such as a user interface color=green system message, a language=English system message, a tablet view orientation=portrait system message, etc. The application message queue may receive and/or store system messages while the application is suspended. Because overlapping messages may be received over time that may render currently queued messages irrelevant (e.g., while suspended, a first message that the tablet view orientation has been set to portrait may be received, then later a second message that the tablet view orientation has been set to landscape may be received, which may make the first message irrelevant), it may be advantageous to manage the application message queue so that the application may be placed into an execution state in a current up-to-date application state. Accordingly, a first system message directed to the application queue while the application is in the suspend state may be received. A determination may be made as to whether the first system message corresponds to a second system message within the application message queue. Upon determining the first system message corresponds to the second system message, the first system message and/or the second system message may be modified and/or deleted (e.g., a newly received first system message that a user interface color=green may be placed in the application message queue, while an already queued second system message that the user interface color=red may be deleted). In this way, upon resumption of the application into the execution state, the application may process relevant system messages from the application message queue as opposed to "stale" and/or irrelevant system messages. Managing the application message queue may have an additional positive performance impact in that the redundant messages do not unnecessarily consume system resources when the target process is not runnable/executable (e.g., a new message may be dropped/deleted, older corresponding messages may be dropped/deleted while the new message may be retained, messages may be intelligently merged, etc.).

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
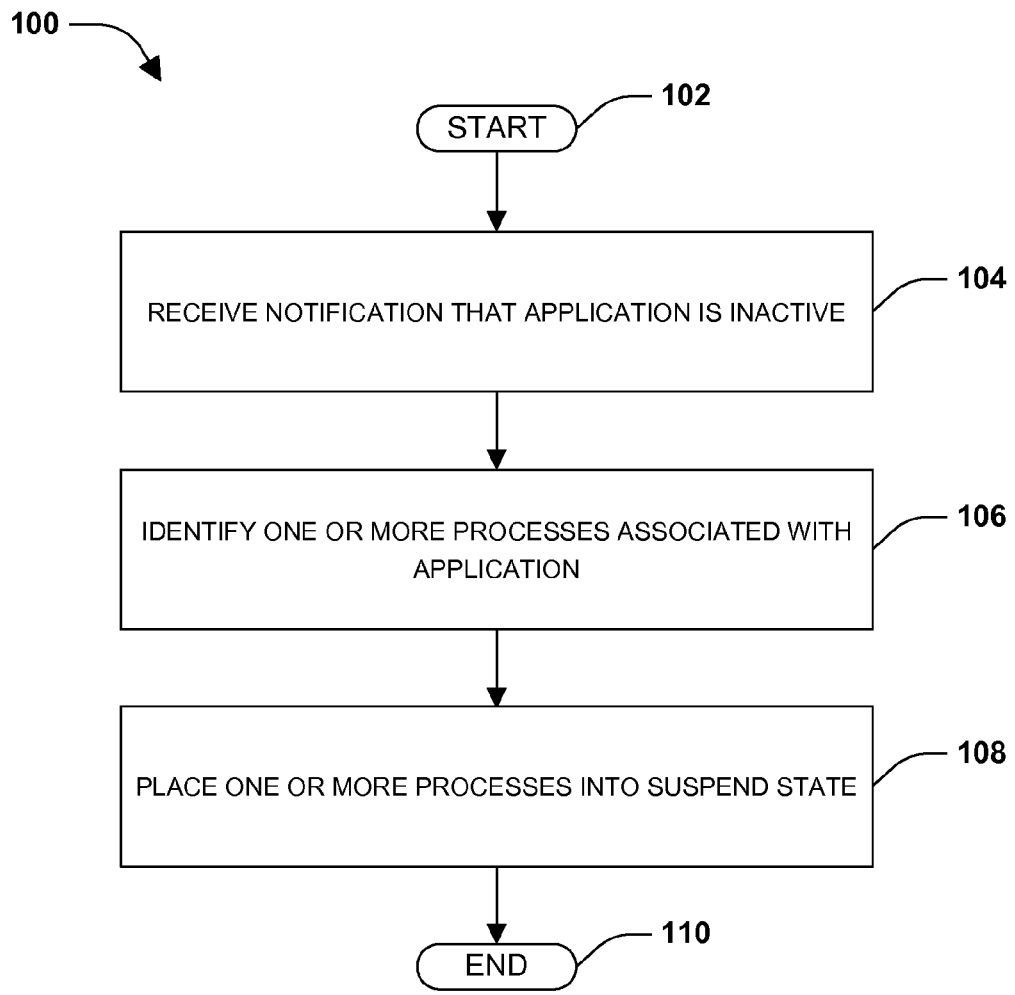
FIG. 1 is a flow chart illustrating an exemplary method of suspending one or more processes associated with an application.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

One or more systems and/or techniques are provided herein for suspending one or more processes associated with an application, determining whether to resume a suspended process based upon one or more wake policies, and managing an application state of an application are provided herein. In particular, one or more processes associated with an application may be suspended (e.g., processes associated with an application may be identified based upon a logical container hierarchy, and may be suspended as a group). A suspended process may be resumed based upon maintaining a set of wake policies indicating reasons to resume the suspended process into an execution state (e.g., if a threshold number of inter-process communication calls from a requesting application to a suspended process are received, then the suspended process may be placed into an execution state to process the inter-process communication calls). During suspension of an application, an application state may be derived from timers associated with a suspended application, such that the timers may be rebased using the application state upon resumption of the suspended application into an execution state. Additionally, an application message queue may be managed while an application is suspended so that irrelevant and/or stale messages are modified and/or removed from the application queue. In this way, upon entering the execution state, the application may process relevant system messages so that the application may be placed into a current application state.

One embodiment of suspending one or more processes associated with an application is illustrated by an exemplary method 100 in FIG. 1. At 102, the method starts. At 104, a notification that an application is inactive may be received (e.g., the application may be transitioned into a background state, the application may be invisible to a user (e.g., behind a different application that has been brought to the foreground on a monitor), the user may not have interacted with the application for a period of time, etc.). At 106, one or more processes associated with the application may be identified. In one example, a logical container hierarchy (e.g., logical container hierarchy 308 of FIG. 3) may be consulted to determine which processes are associated with the application. For example, the application may be assigned to a root logical container within the logical container hierarchy, while processes associated with the application may be assigned to logical containers associated with (e.g., nested within) the root logical container.

In one example of identifying one or more processes, a first process may be determined as being associated with the application based upon a determination that the first process is assigned to a first logical container associated with (e.g., nested within) the root logical container (e.g., the first process may be a direct child process of the application). In another example, a second process may be determined as being associated with the application based upon a determination that the second process is assigned to the first logical container associated with the root logical container (e.g., the second process may be a direct child process of the application). In another example, a second process may be determined as being associated with the application based upon a determination that the second process is assigned to a second logical container associated with the first logical container (e.g., the second process may be direct child process of the first process and/or an indirect child process of the application). In this way, the one or more processes associated with the application may be determined.

At 108, the one or more processes may be placed into a suspend state. For example, a suspended process may be marked as ineligible for processor execution, such that the threads comprising the suspended process may not be considered as candidates by a thread scheduler for execution. In one example, the application and/or other applications associated with the one or more processes may be notified of the suspension, which may provide an opportunity for such applications to save state information (e.g., a social network application may save state information associated with a current profile being viewed by a user, such that upon resumption, the social network application may present the current profile to the user). Memory content associated with a suspended process may be saved to a storage device as saved memory content. In this way, the saved memory content may be returned to memory, which may allow the suspended process to quickly resume execution.

It may be appreciated that a newly created process (e.g., a process created after the one or more processes are suspended) may be placed into a suspend state based upon a determination that the newly created process is associated with one or more of the suspended processes and/or the inactive application. For example, a newly created process may be determined as associated with the inactive application based upon determining that the newly created process is assigned to a logical container associated with the root logical container of the inactive application. In this way, the newly created process may be placed into the suspend state. At 110, the method ends.

Figure 2:
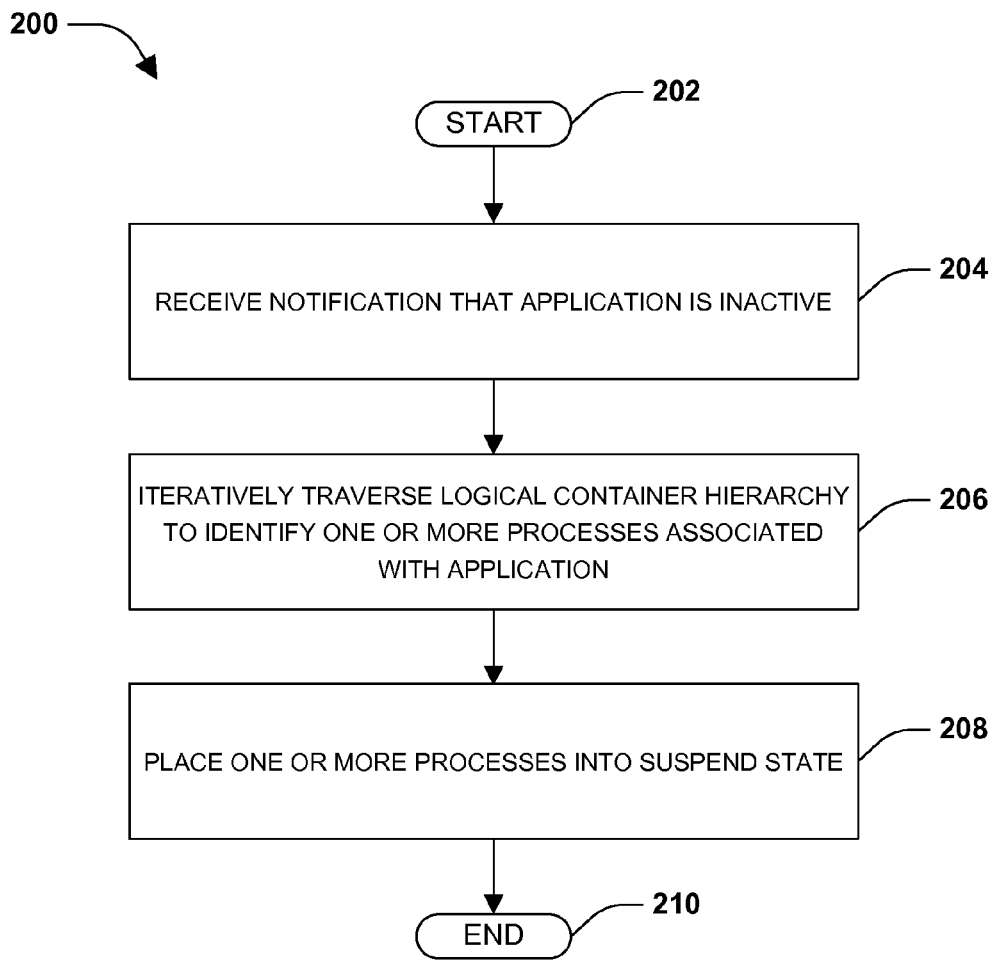
FIG. 2 is a flow chart illustrating an exemplary method of suspending one or more processes associated with an application.

One embodiment of suspending one or more processes associated with an application is illustrated by an exemplary method 200 in FIG. 2. At 202, the method starts. At 204, a notification that an application is inactive may be received. At 206, a logical container hierarchy may be iteratively traversed to identify one or more processes associated with the application. In one example, a root logical container assigned to an application may be identified within the logical container hierarchy. A first process may be determined as being associated with the application based upon determining that the first process is assigned to a first logical container associated with (e.g., nested within) the root logical container. In another example, a second process may be determined as being associated with the application based upon a determination that the second process is assigned to the first logical container associated with the root logical container (e.g., the second process may be a direct child process of the application). In another example, a second process may be determined as being associated with the application based upon a determination that the second process is assigned to a second logical container associated with the first logical container (e.g., the second process may be a direct child process of the first process and/or an indirect child process of the application). In this way, the one or more processes associated with the application may be identified. At 208, the one or more processes may be placed into a suspend state. In this way, processes and/or newly created processes associated with the inactive application may be suspended. At 210, the method ends.

Figure 3:
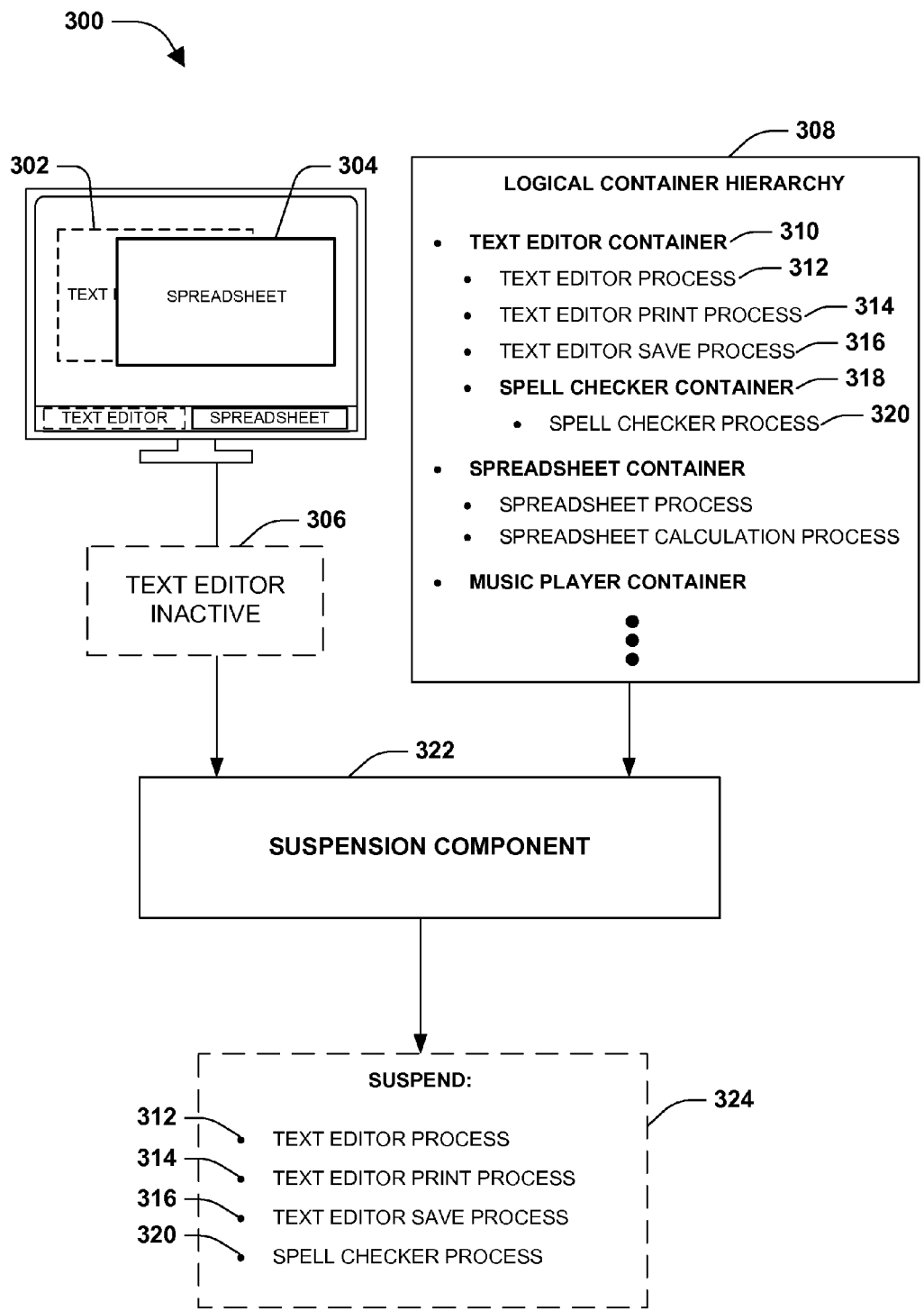
FIG. 3 is a component block diagram illustrating an exemplary system for suspending one or more processes associated with an application.

FIG. 3 illustrates an example of a system 300 configured to suspend one or more processes associated with an application. The system 300 may comprise a suspension component 322. The suspension component 322 may be configured to receive a notification that an application is inactive. For example, a text editor application 302 and a spreadsheet application 304 may be hosted within a computing environment. A user may switch from the text editor application 302 to the spreadsheet application 304, which may result in the text editor application 302 transitioning to a background state. In this way, the suspension component 322 may receive a text editor inactive notification 306.

The suspension component 322 may be configured to iteratively traverse a logical container hierarchy 308 to identify one or more processes associated with the application. In one example, the text editor application 302 may be associated with a text editor process 312 assigned to a text editor root logical container 310. While executing, the text editor application 302 may have created one or more child processes, such as a text editor print process 314 and/or a text editor save process 316, which may have been assigned to the text editor root logical container 310. Additionally, the text editor application 302 may have invoked spell check functionality associated with a spell checker process 320 assigned to a spell checker logical container 318. The spell checker logical container 318 may be nested within the text editor root logical container 310 because the spell checker process 320 may be associated with the text editor application 302. Accordingly, the suspension component 322 may determine that the text editor print process 314, the text editor save process 316, and/or the spell checker process 320 may be associated with the text editor application 302 based upon traversing the logical container hierarchy 308. In this way, the suspension component 322 may suspend 324 the text editor process 312, the text editor print process 314, the text editor save process 316, the spell checker process 320, and/or newly created processes associated with the text editor application 302 based upon the text editor application 302 being inactive, which may result in improved power consumption because such processes and/or applications may be ineligible to consume processor execution resources and/or other power consuming resources.

Figure 4:
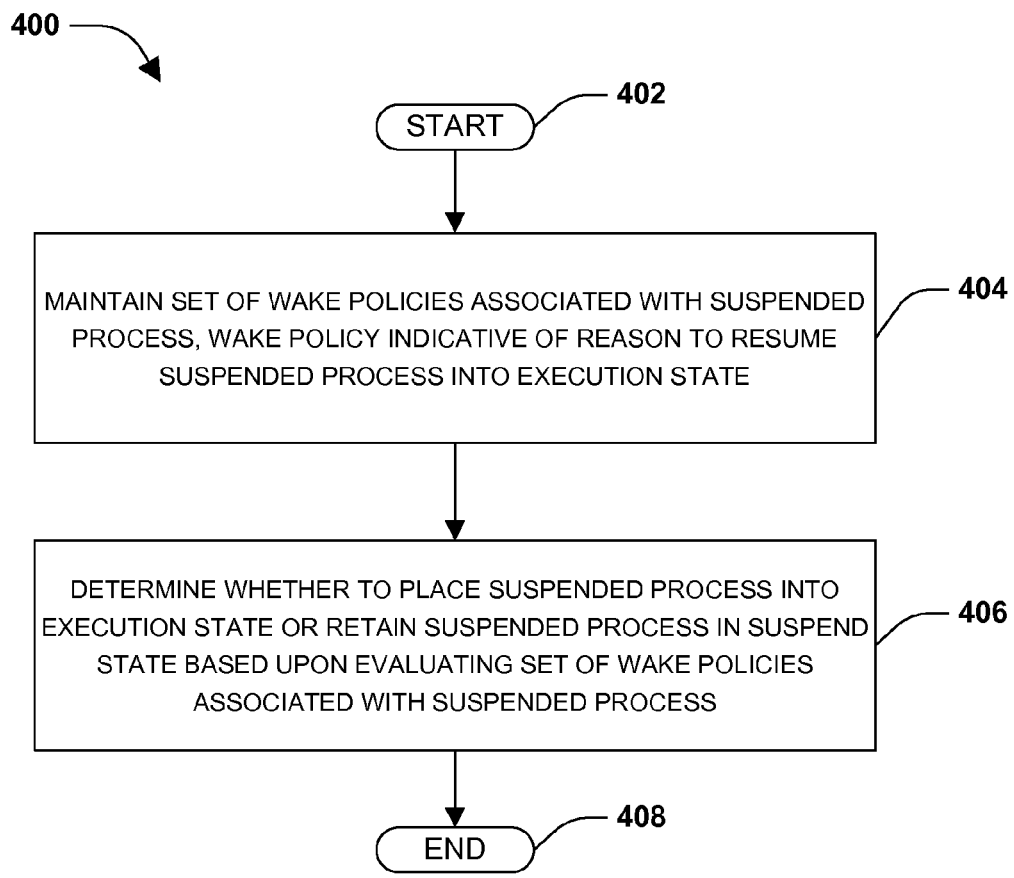
FIG. 4 is a flow chart illustrating an exemplary method of determining whether to resume a suspended process based upon a set of wake policies.

One embodiment of determining whether to resume a suspended process based upon a set of wake policies is illustrated by an exemplary method 400 in FIG. 4. At 402, the method starts. At 404, a set of wake policies associated with a suspended process may be maintained. A wake policy may be indicative of a reason to resume the suspended process into an execution state. In one example, a wake policy may correspond to an inter-process communication call from a requesting application to the suspended process (e.g., a spreadsheet application may attempt to request "cut" text from a text editor application to satisfy a "paste" operation; a presentation application may comprise a "pasted" text object whose functionality and/or data may be provided by the text editor application; etc.). In another example, a wake policy may correspond to user input associated with the suspended application (e.g., a user may attempt to interact with a suspended text editor application). In another example, a component (e.g., a hardware component, a software component, a remote third party component, a web component, etc.) may request access to the suspended process. In another example, a wake policy may correspond to a transition of a suspended application associated with the suspended process from a background state to a foreground state. In this way, the set of wake policies may comprise a variety of wake policies associated with various events/reasons for resuming the suspended process.

A counter may be associated with a wake policy. The counter may be indicative of a number of wake notifications associated with the wake policy (e.g., instances of an event/reason specified by a wake policy) that are currently pending for the suspended process. A wake notification may be a notification of an event/reason specified by a wake policy, such as a notification of an inter-process communication call. The counter may be incremented (e.g., an event associated with a wake notification may be pending) and/or decremented (e.g., an event associated with a wake notification may be completed). It may be appreciated that various wake policies and corresponding counters may be maintained within the set of wake policies. For example, a first counter for a user input wake policy may be incremented to 1 upon receiving a first wake notification that a user attempted to interact with a suspended text editor. The first counter for the user input wake policy may be incremented to 2 upon receiving a second wake notification that the user made a second attempt to interact with the suspended text editor. A second counter for an inter-process communication wake policy may be incremented to 1 upon receiving a third wake notification that a spreadsheet application attempted to communicate with the suspended text editor. The second counter may be decremented to 0 upon a notification that the spreadsheet application no longer desires to communicate with the suspended text editor (e.g., a user shuts down the spreadsheet application). In this way, counters associated with wake policies within the set of wake policies may be maintained.

In one example, wake notifications may be filtered (e.g., ignored, deleted, and/or refrained from being issued) based upon how a counter is transitioned in light of an execution/suspend state of the process. In one example, upon determining the process is in the execution state, a wake notification transitioning the counter from a 0 value to a 1 value may be filtered (e.g., a wake notification that may trigger a wake policy to place an already executing process into the executing state may be filtered because the executing process is already executing). In another example, upon determining the process is in the suspend state, a wake notification transitioning the counter from a 1 value to a 0 value may be filtered (e.g., a wake notification that may trigger a wake policy to place an already suspended process into the suspended state may be filtered because the suspended process is already suspended).

At 406, the set of wake policies associated with the suspended process may be evaluated to determine whether to place the suspended process into an execution state or retain the suspended process in a suspend state. In one example, the suspended process may be placed into the execution state based upon determining at least one counter associated with a wake policy comprises a value above a threshold value (e.g., at least one counter has a value greater than 0). If no counter comprises a value above the threshold value, then the suspended process may be retained in the suspend state. In another example, values of one or more counters may be aggregated together to create an aggregated value. For example, an aggregated value of 4 may be determined based upon a first counter associated with a user input wake policy having a value of 2 and a second counter associated with a remote third party inter-process communication call wake policy having a value of 2. The aggregated value of 4 may be adjusted based upon weights associated with the wake policies. For example, the user input wake policy may have a weighted value of 4 (e.g., based upon applying a 2× weight modifier to the value of 2) because it may be desirable to resume/wake the suspended process in response to user input so that an application associated with the suspended process is highly responsive to the user. The remote third party inter-process communication policy may have a weighted value of 1 (e.g., based upon apply a 0.5× weight modifier to the value of 2) because it may be desirable to throttle down responsiveness to remote third parties that may be attempting to "noisily" communicate with the suspended process for non-critical and/or non-desirable reasons. The suspended process may be placed into the execution state based upon determining whether the aggregated value is above a threshold value (e.g., an aggregated value of 5 may be above a threshold value of 3).

It may be appreciated that in one example, the set of wake policies may be associated with a logical container assigned to the suspended process within a logical container hierarchy. Accordingly, if the suspended process is placed into the execution state, then one or more processes and/or applications associated with the suspended process may be placed into the execution state. For example, a text editor process may be placed into the execution state. The text editor process may be assigned to a text editor root logical container. A spell checker process may also be placed into the execution state based upon determining the spell checker process is assigned to a logical container associated with (e.g., nested within) the text editor root logical container. In this way, one or more related processes may be resumed into the execution state. In one example, saved memory content associated with the resumed processes may be restored to memory so that such processes may promptly resume execution in a responsive manner, while still conserving power.

Once placed into the execution state as an executing process, a determination may be made as to whether and/or when to return the executing process to the suspend state. In one example, a current state of the set of wake policies may be evaluated (e.g., if counter values and/or an aggregate value of counter values are not above the threshold value, then the executing process may be placed back into the suspend state). In another example, a time elapsed since completion of a wake notification that caused the executing process to be placed into the execution state may be evaluated. For example, a presentation application may comprise a "pasted" text object whose functionality and/or data may be provided by a suspended text editor application. An inter-process communication call may be made from the presentation application to the suspended text editor application regarding the "pasted" text object. A wake notification of the communication call may be received, and the suspended text editor application may be placed into an execution state to satisfy the inter-process communication call. It may be advantageous to allow the text editor application to remain in the execution state for a period of time (e.g., as opposed to immediately placing the text editor application back into the suspend state) because the presentation application may make subsequent inter-process communication calls to the text editor application regarding the "pasted" text object. At 408, the method ends.

Figure 5:
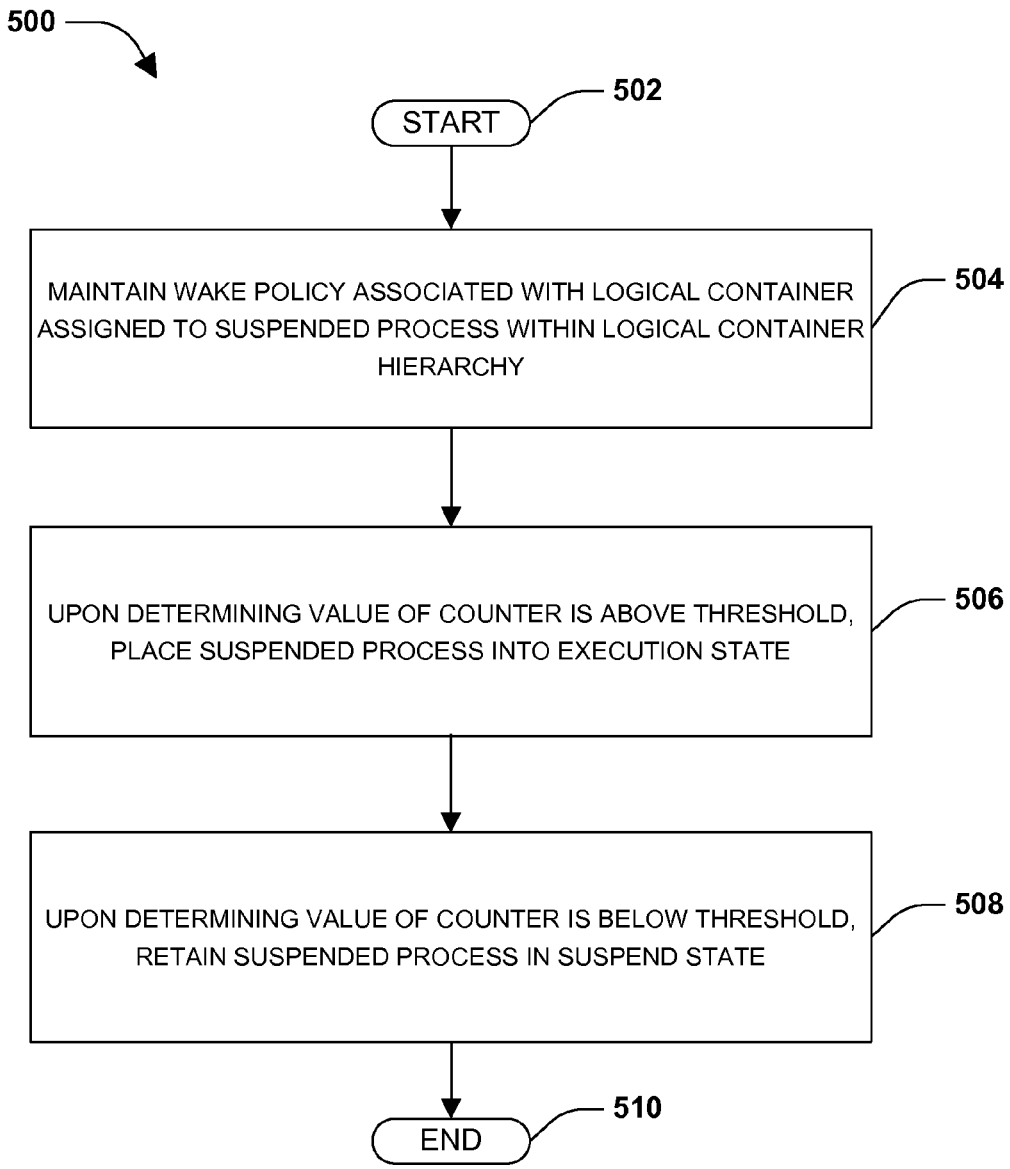
FIG. 5 is a flow chart illustrating an exemplary method of determining whether to resume a suspended process based upon a set of wake policies.

One embodiment of determining whether to resume a suspended process based upon a set of wake policies is illustrated by an exemplary method 500 in FIG. 5. At 502, the method starts. At 504, a wake policy associated with a logical container assigned to a suspended process within a logical container hierarchy may be maintained. The wake policy may be indicative of a reason to resume the suspended process into an execution state. The wake policy may comprise a counter indicative of a number of wake notifications associated with the wake policy that are currently pending for the suspended process. A wake notification may be a notification of an event/reason for resuming the suspended process specified by a wake policy, such as a notification of an inter-process communication call. The counter may be incremented based upon receiving a wake notification associated with the wake policy (e.g., a counter associated with a user input wake policy may be incremented based upon receiving a wake notification indicating a user attempted to interact with a suspended application associated with the suspended process). The counter may be decremented based upon receiving notification that the wake notification is not currently pending (e.g., the counter may be decremented based upon a notification that the user logged off a computing device hosting the suspended application).

In one example, upon determining a value of the counter is above a threshold, the suspended process may be placed into an execution state, at 506. In one example the logical container hierarchy may be traversed to identify one or more additional suspended processes associated with the suspended process based upon determining that the one or more additional suspended processes are assigned to logical containers associated with (e.g., nested within) the logical container of the suspended process. In this way, the one or more additional suspended processes may be placed into the execution state. In another example, upon determining the value of the counter is below the threshold, the suspended process may be retained in the suspend state, at 508. In this way, the suspended process may be placed into the execution state or retained in the suspend state based upon the wake policy. At 510, the method ends.

Figure 6:
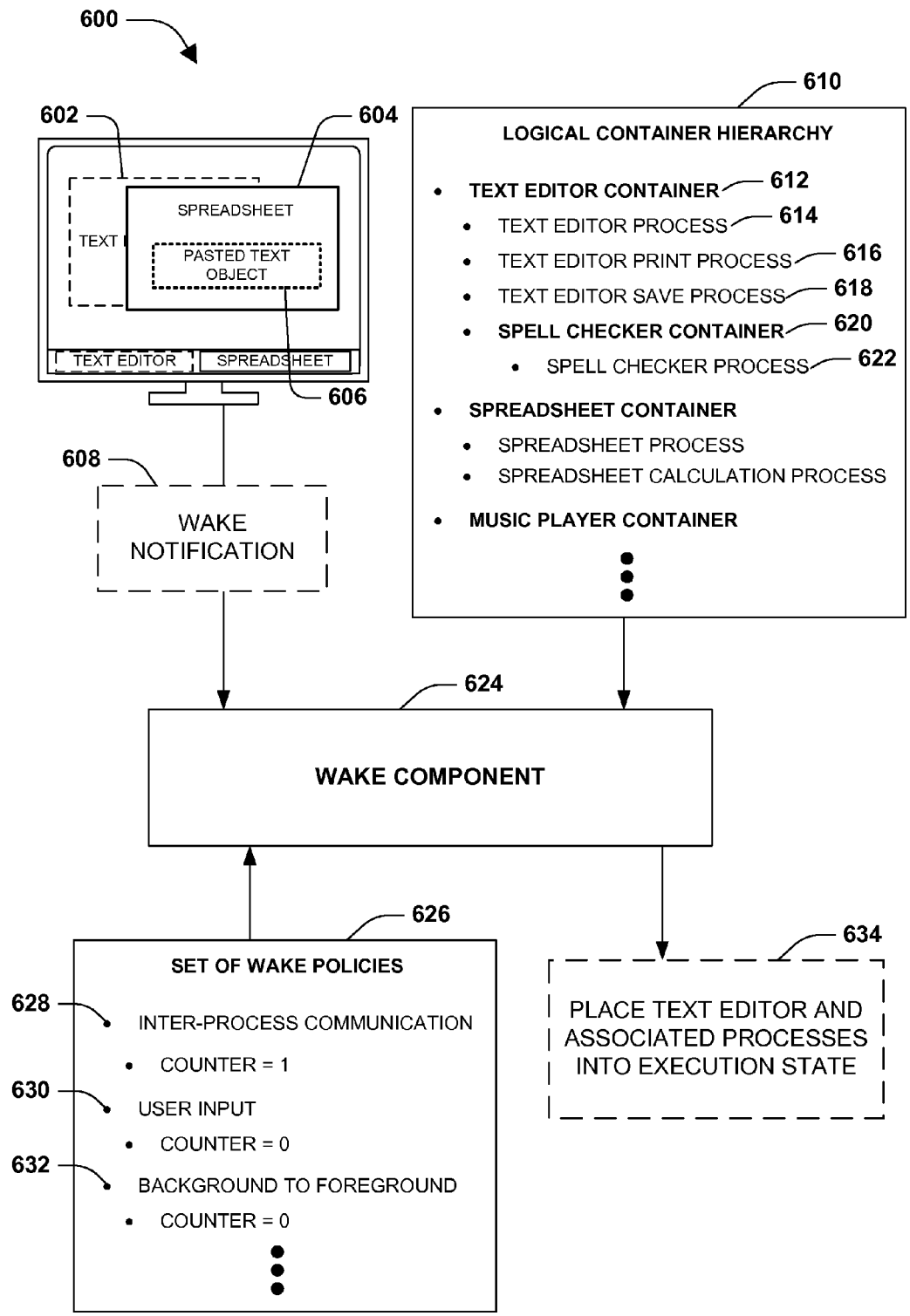
FIG. 6 is a component block diagram illustrating an exemplary system for determining whether to resume a suspended process based upon a wake policy.

FIG. 6 illustrates an example of a system 600 configured to determine whether to resume a suspended process based upon a wake policy. The system 600 may comprise a wake component 624. The wake component 624 may be configured to maintain a wake policy (e.g., a set of wake policies 626, such as inter-process communication wake policy 628, user input wake policy 630, background to foreground wake policy 632, and/or other wake policies). The wake policy may be associated with a logical container assigned to a suspended process within a logical container hierarchy 610. For example, the set of wake policies 626 may be associated with a text editor logical container 612 associated with a suspended text editor process 614 of a suspended text editor application 602. In one example, a suspended text editor print process 616, a suspended text editor save process 618, and/or a suspended spell checker process 622 may have been suspended based upon the suspension of the text editor process 614 because such processes may be related (e.g., the suspended spell checker process 622 may be assigned to a spell checker logical container 620 nested within the test editor logical container 612).

The wake policy, such as the inter-process communication wake policy 628, may be associated with a counter indicative of a number of wake notifications associated with the wake policy that are currently pending for the suspended process. The wake component 624 may be configured to increment the counter based upon receiving a wake notification associated with the wake policy and/or decrement the counter based upon receiving a notification that the wake notification is not currently pending. For example a wake notification 608 may be received. The wake notification 608 may indicate that a spreadsheet application 604 has sent an inter-process communication call to the suspended text editor application 602 regarding a pasted text object 606 (e.g., the pasted text object 606 may derived functionality and/or data from the suspended text editor application 602, and thus the spreadsheet application 604 requests such functionality and/or data from the suspended text editor application 602). The wake component 624 may increment the counter associated with the inter-process communication wake policy 628 to 1 based upon the wake notification 608.

The wake component 624 may be configured to place the suspended process into an execution state based upon determining a value of the counter is above a threshold, otherwise the wake component 624 may retain the suspended process in a suspend state. For example, the wake component 624 may place the suspended text editor process 614 into an execution state based upon the counter of the inter-process communication wake policy 628 comprising a value of 1 that is greater than 0. The wake component 624 may traverse the logical container hierarchy 610 to identify one or more additional suspended processes associated with the suspended text editor process 614 that is to be resumed into the execution state. For example, the suspended text editor print process 616, the suspended text editor save process 618, and/or the suspended spell checker process 622 may be identified based upon determining such processes are assigned to the text editor logical container 612 and/or logical containers associated with (e.g., nested within) the text editor logical container 612, such as the spell checker logical container 620. In this way, the wake component 624 may place 634 the suspended text editor process 614, the suspended text editor print process 616, the suspended text editor save process 618, and/or the suspended spell checker process 622 into the execution state, such that the text editor application 602 may respond to the inter-process communication call from the spreadsheet application 604. In one example, the wake component 624 may place saved memory content associated with the resumed processes into memory to improve responsiveness of the text editor application 602.

Figure 7:
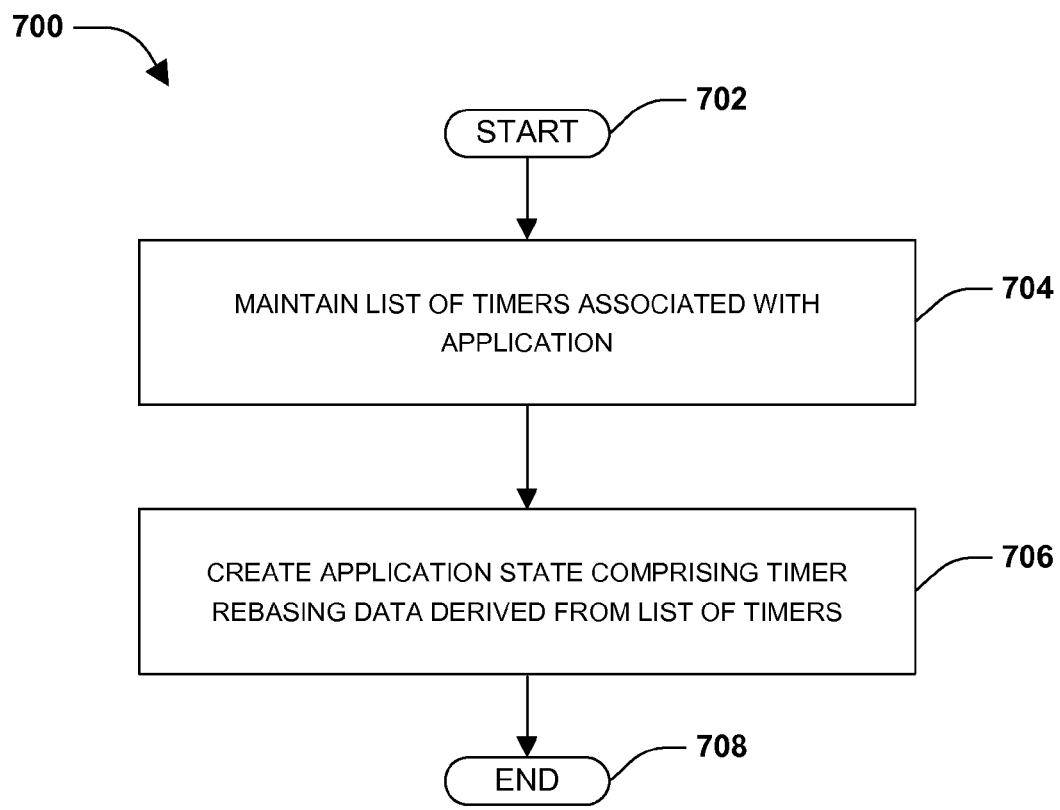
FIG. 7 is a flow chart illustrating an exemplary method of managing an application state of an application.

One embodiment of managing an application state of an application is illustrated by an exemplary method 700 in FIG. 7. At 702, the method starts. At 704, a list of timers associated with an application may be maintained (e.g., one or more timers of processes associated with the application may be maintained). That is, processes associated with the application may be associated with one or more timers, such as relative timers (e.g., a timeout set at 20 seconds by a text editor application for a text editor save process), absolute timers (e.g., a timeout set at 5:00 AM 9/15/11 by a calendar application), and/or other types of timers. In one example of a timer, a text editor application may set a relative timer of 20 seconds for a text editor save process because the text editor save process generally does not take more than 20 seconds to complete unless an error has occurred. In another example of a timer, a calendar application may set an absolute timer of 5:00 AM 9/15/11 as a reminder to provide a user with a wake-up notification at 6:00 AM 9/15/11.

In one example, one or more of the timers may be associated with a root logical container assigned to the application and/or one or more logical containers assigned to processes associated with the application within a logical container hierarchy. For example, a first timer associated with a first process of the application may be maintained based upon determining the first process is assigned to a first logical container associated with (e.g., nested within) the root logical container within the logical container hierarchy. A second timer associated with a second process of the application may be maintained based upon determining the second process is assigned to a second logical container associated with the root logical container and/or the first logical container. In this way, the list of timers associated with processes of the application may be maintained.

Upon receiving a notification that the application is to be placed into a suspend state, an application state comprising timer rebasing data derived from the list of timers may be created, at 706. In one example, absolute timer rebasing data associated with an absolute timer may be stored within the application state. The absolute timer rebasing data may comprise an original expiration time of the absolute timer (e.g., the calendar application may desire a notification at 5:00 AM 9/15/11 regardless of whether the time has passed or not due to a process and/or application being placed into a suspend state). In another example, relative timer rebasing data associated with a relative timer may be stored within the application state (e.g., the text editor application may desire a timeout notification if a text editor save process does not complete within 20 seconds while in the execution state). The relative timer rebasing data may comprise a time till expiration value (e.g., a time span from when the relative timer is suspended to an original expiration time of the relative timer). The relative timer rebasing data may, for example, comprise a time till expiration value different than the original expiration time because the text editor application may be concerned with whether the text editor save process took longer than 20 seconds to complete while in the execution state (e.g., taking longer than 20 seconds may indicate a fatal error occurred), such that a suspension of the text editor save process may toll the relative timer because an expiration of the relative timer due to the text editor save process being suspended may not be representative of a fatal timeout with which the text editor application may be concerned. In this way, the application state may be created.

Upon receiving notification that the application is to be placed into an execution state from the suspend state, the timer rebasing data within the application state may be applied to one or more timers associated with the list of timers. In one example, absolute timer rebasing data may be applied to an absolute timer to create a rebased absolute timer. The rebased absolute timer may comprise an original expiration time of the absolute timer. If the original expiration time has expired, then a notification of the expiration may be provided to the application. In another example, relative timer rebasing data may be applied to a relative timer to create a rebased relative timer. The rebased relative timer may comprise a rebased expiration timer derived from applying the time till expiration value to a current time. In this way, the application and/or processes associated with the application may be placed into a current application state with respect to timers. At 708, the method ends.

Figure 8:
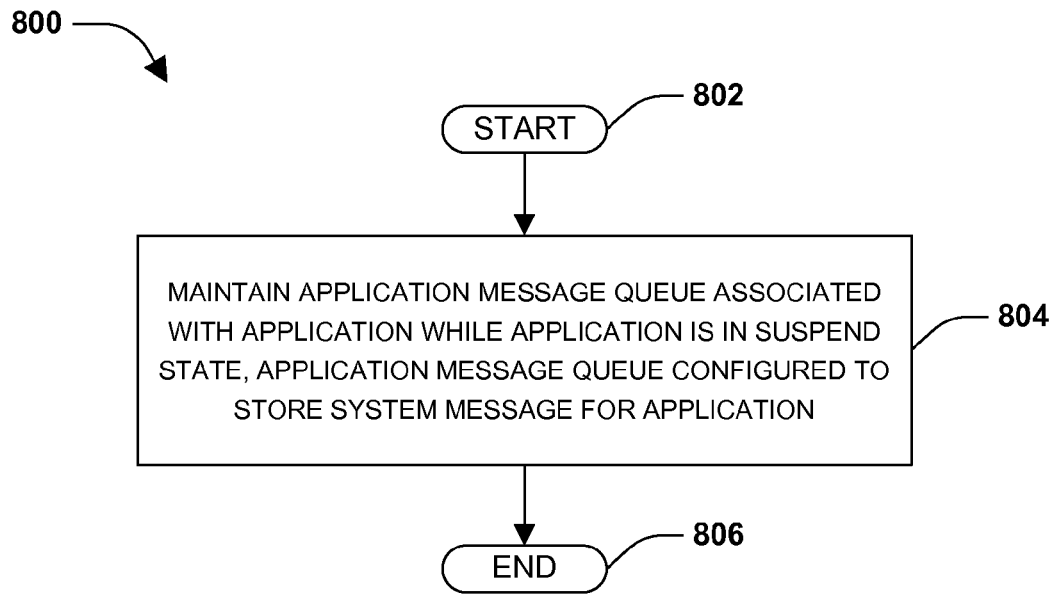
FIG. 8 is a flow chart illustrating an exemplary method of managing an application state of an application.

One embodiment of managing an application state of an application is illustrated by an exemplary method 800 in FIG. 8. At 802, the method starts. An application may be associated with an application message queue. The application message queue may be configured to store system messages for the application. In this way, the application may receive system messages through the application message queue (e.g., the application may dequeue system messages while in an execution state). A system message may correspond to a variety of information relating to an application state, such as a change in system settings. In one example, a user may rotate a tablet device, which may change the view orientation from a landscape view mode to portrait view mode. An operating system of the tablet device may queue a system message in the application message queue indicating that the current view mode has been set to portrait. In this way, the application may dequeue the system message, and may render itself in a portrait mode to match the current state of tablet device. It may be appreciated that a system message may comprise a variety of other information, such as user interface color, language settings, input device information, etc.

At 804, the application message queue associated with an application may be maintained while the application is in a suspend state. That is, the application message queue may generally receive system messages regardless of whether the application is in the suspend state and/or an execution state (e.g., while a text editor application is suspended, a user may rotate a tablet device multiple times, and thus the operating system may queue multiple system messages corresponding to current view modes). Unfortunately, multiple corresponding system messages may be queued within the application message queue while the application is in the suspend state, where one or more messages may become irrelevant and/or stale. For example, while a text editor application is suspended, 4 system messages may be queued in the application message queue over time. A user may change a system language setting of a tablet device to German, and thus a language=German system message may be queued in the application system queue. Next, the user may rotate the tablet device to landscape mode, and thus a view mode=landscape may be queued in the application system queue. The user may then change the system language setting of the tablet device to English, and thus a language=English system message may be queued in the application system queue. Finally, the user may rotate the tablet device to portrait mode, and thus a view mode=portrait may be queued in the application system queue. In this way, the application message queue may comprise irrelevant and/or stale system messages, such as the language=German and the view mode=landscape system message because the language and view mode has been changes to other values. Accordingly, the application message queue may be maintained to delete and/or modify irrelevant and/or stale messages.

In one example, a first system message direct to the application message queue may be received while the application is in the suspend state. A determination may be made as to whether the first system message corresponds to a second system message within the application message queue (e.g., if the first system message corresponds to a language system message, then the application message queue may be traversed to identify one or more system message corresponding to the language system message). Upon determining the first system message corresponds to the second system message, the first system message and/or the second system message may be deleted and/or modified (e.g., the first system message, which may be newer and/or more relevant, may be retained, while the second system message may be deleted). For example, relevancy rankings may be assigned to the first and second system messages to determine which system message to modify and/or delete. At 806, the method ends.

Figure 9:
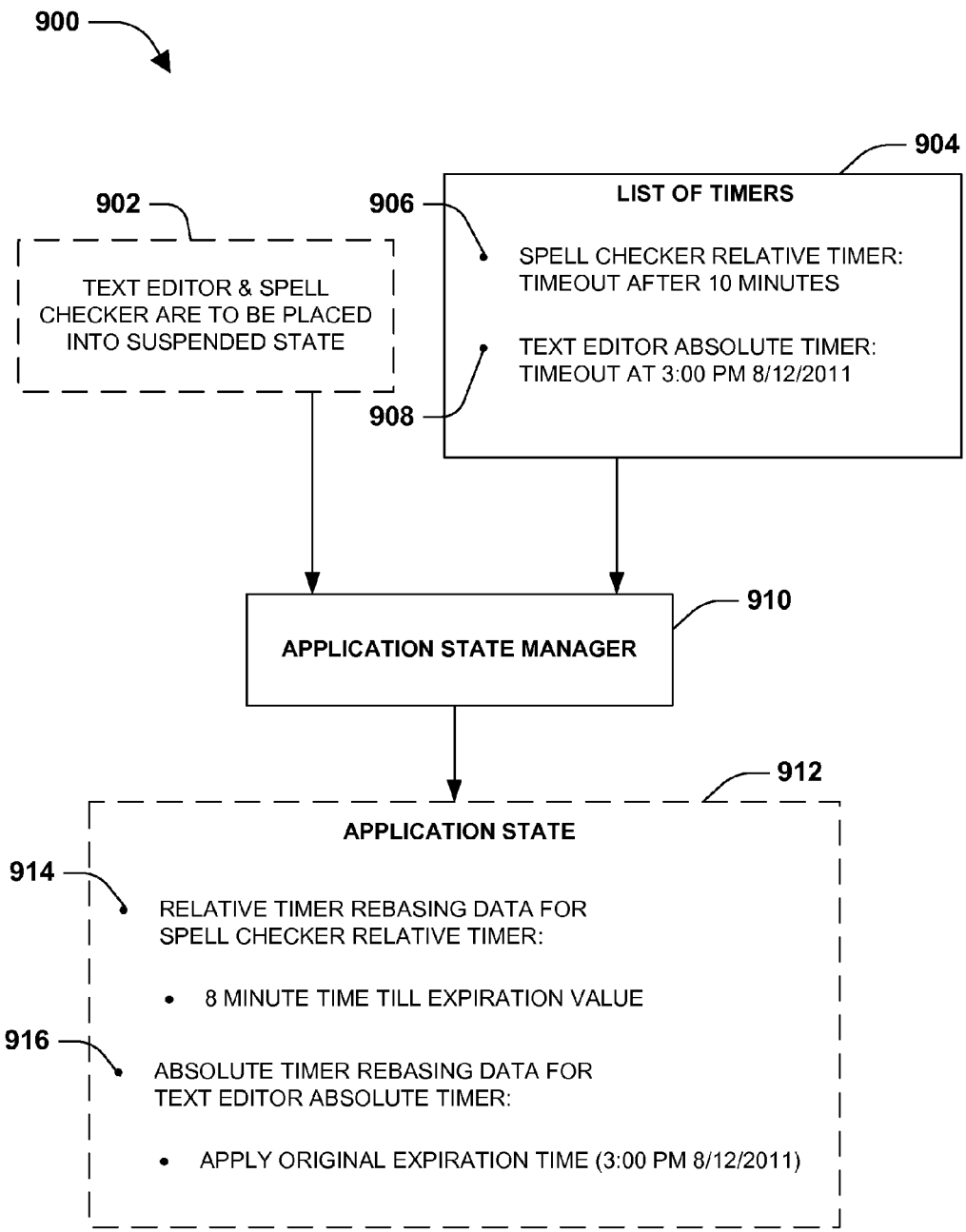
FIG. 9 is a component block diagram illustrating an exemplary system for managing an application state of an application.

FIG. 9 illustrates an example of a system 900 configured to manage an application state of an application, such as timer data and/or system message data. The system 900 may comprise an application state manager 910. The application state manager 910 may be configured to maintain a list of timers 904 associated with an application. For example, the list of timers 904 may comprise a spell checker relative timer 906 set to timeout after 10 minutes, a text editor absolute timer 908 set to timeout at 3:00 PM 8/12/2011, and/or other timers. The application state manager 910 may receive a notification 902 that the application is to be placed into a suspend state. For example, the notification 902 may indicate that a text editor application and/or a spell checker application are to be placed into the suspend state.

Upon receiving the notification 902, the application state manager 910 may create an application state 912 comprising timer rebasing data derived from the list of timers 904. For example, relative timer rebasing data 914 for the spell checker relative timer 906 may be created. The relative timer rebasing data 914 may comprise a time till expiration value of 8 minutes because 2 out of the 10 minutes may have elapsed by the time the spell checker application was suspended, and thus leaving 8 minutes till expiration of the 10 minute relative timer. Absolute timer rebasing data 916 for the text editor absolute timer 908 may be created. The absolute timer rebasing data 916 may comprise an original expiration time of 3:00 PM 8/12/2011. In this way, the application state 912 may be created.

Upon receiving notification that the text editor application and/or the spell checker application are to be placed into an execution state, the relative timer rebasing data 914 and/or the absolute timer rebasing data 916 within the application state 912 may be applied to the spell checker relative timer 906 and/or the text editor absolute timer 908. In this way, a rebased relative timer of 8 minutes may be created and a rebased absolute timer of 3:00 PM 8/12/2011 may be created.

Figure 10:
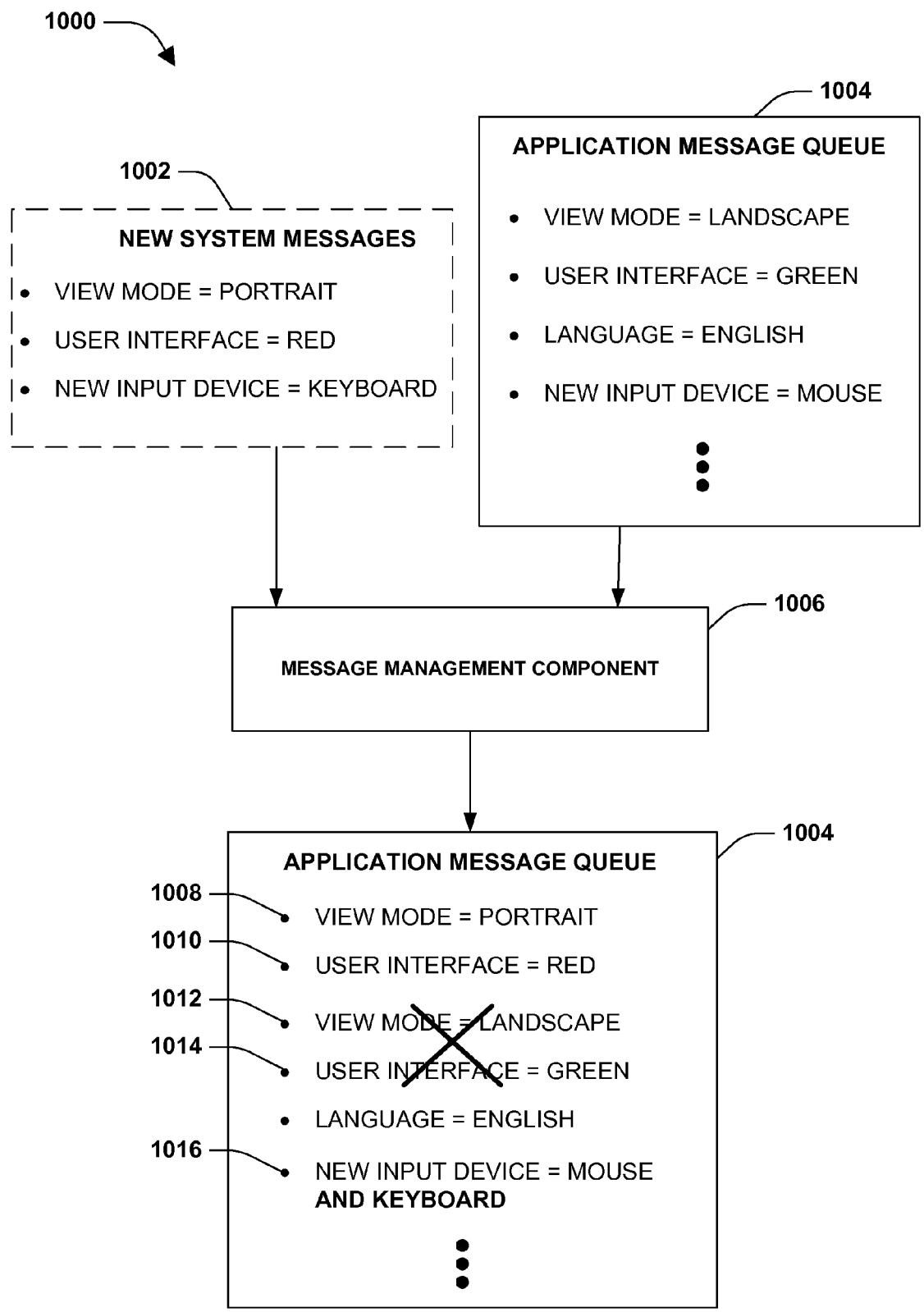
FIG. 10 is a component block diagram illustrating an exemplary system for managing an application state of an application.

FIG. 10 illustrates an example of a system 1000 configured to manage an application state of an application, such as system messages. The system 1000 may comprise a message management component 1006. The message management component 1006 may be configured to maintain an application message queue 1004 associated with an application while the application is in a suspend state. The application message queue 1004 may be configured to store system messages for the application. In one example, a text editor application may be associated with the application message queue 1004. The text editor application may be placed into the suspend state. It may be appreciated that new system messages may be queued within the application message queue 1004 while the text editor application is suspended. A current state of the application message queue 1004 may comprise a view mode=landscape system message, a user interface=green system message, a language=English system message, a new input device=mouse, and/or other system messages.

While the application is suspended, new system messages 1002 may be received (e.g., view mode=portrait new system message, user interface=red new system message, new input device=keyboard new system message, and/or other new system messages). The message management component 1006 may be configured to maintain the application message queue 1004 in light of the new system message 1002 so that irrelevant and/or stale system messages are deleted and/or modified from the application message queue 1004. In one example, the view mode=portrait new system message may be determined as corresponding to the view mode=landscape system message within the application message queue 1004. Because the view mode=portrait new system message may render the view mode=landscape system message irrelevant and/or stale, the view mode=landscape system message may be deleted 1012 and the view mode=portrait new system message may be added 1008 to the application message queue 1004.

In another example, the user interface=red new system message may be determined as corresponding to the user interface=green system message within the application message queue 1004. Because the user interface=red new system message may render the user interface=green system message irrelevant and/or stale, the user interface=green system message may be deleted 1014 and the user interface=red new system message may be added 1010 to the application message queue 1004. In another example, the new input device=keyboard new system message may be determined as corresponding to the new input device=mouse system message. Because the new input device=keyboard new system message may be supplementary to the new input device=mouse system message, the new input device=mouse system message may be modified 1016 to new input device=mouse and keyboard system message. In this way, the application message queue 1004 may be maintained by the message management component while the application is suspended so that the application, once resumed, may dequeue merely relevant system messages.

Figure 11:
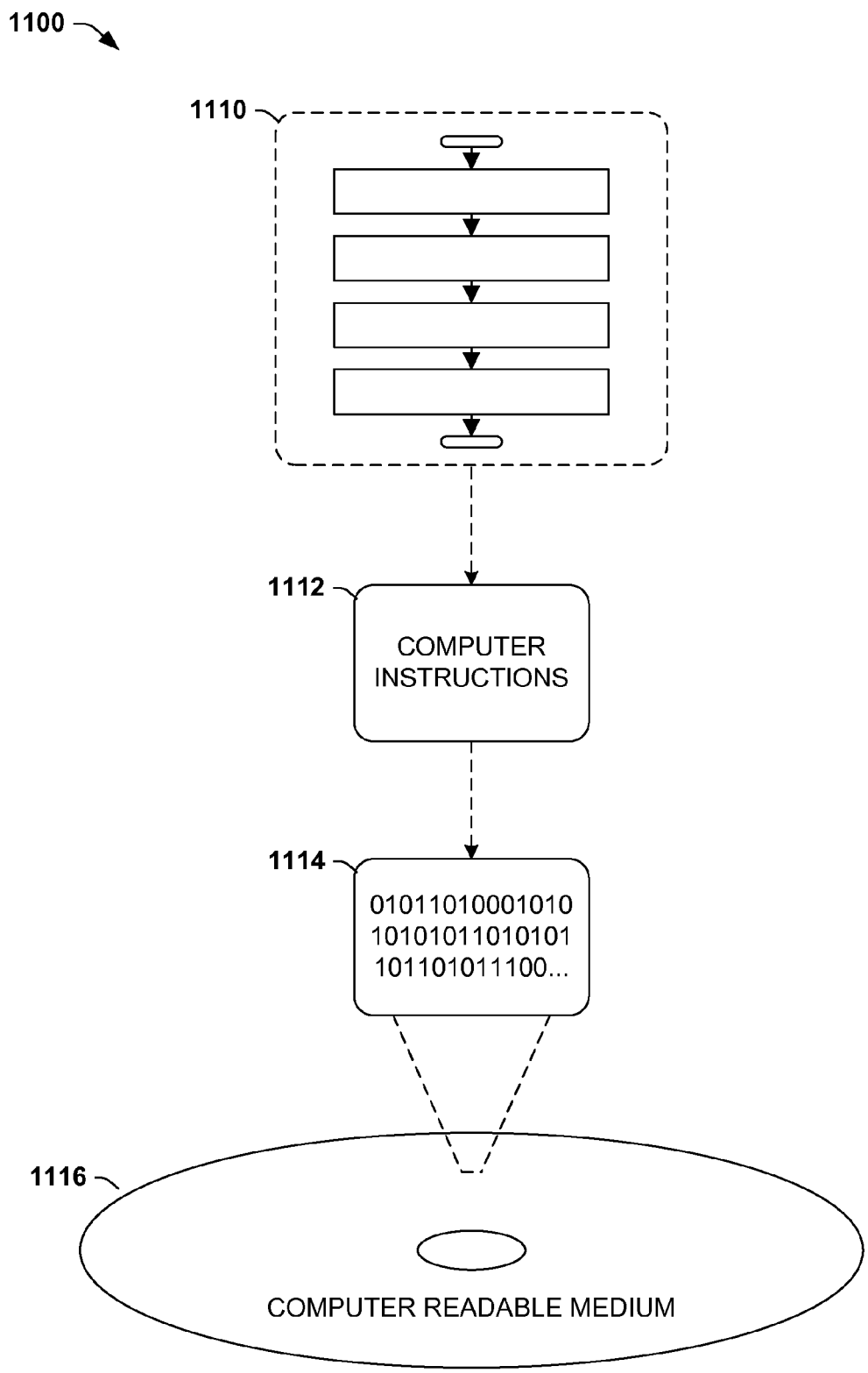
FIG. 11 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 11, wherein the implementation 1100 comprises a computer-readable medium 1116 (e.g., a CD-R, DVD-R, or a platter of a hard disk drive), on which is encoded computer-readable data 1114. This computer-readable data 1114 in turn comprises a set of computer instructions 1112 configured to operate according to one or more of the principles set forth herein. In one such embodiment 1100, the processor-executable computer instructions 1112 may be configured to perform a method 1110, such as at least some of the exemplary method 100 of FIG. 1, at least some of exemplary method 200 of FIG. 2, at least some of exemplary method 400 of FIG. 4, at least some of exemplary method 500 of FIG. 5, at least some of exemplary method 700 of FIG. 7, and/or at least some of exemplary method 800 of FIG. 8, for example. In another such embodiment, the processor-executable instructions 1112 may be configured to implement a system, such as at least some of the exemplary system 300 of FIG. 3, at least some of the exemplary system 600 of FIG. 6, at least some of the exemplary system 900 of FIG. 9, and/or at least some of the exemplary system 1000 of FIG. 10, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 12:
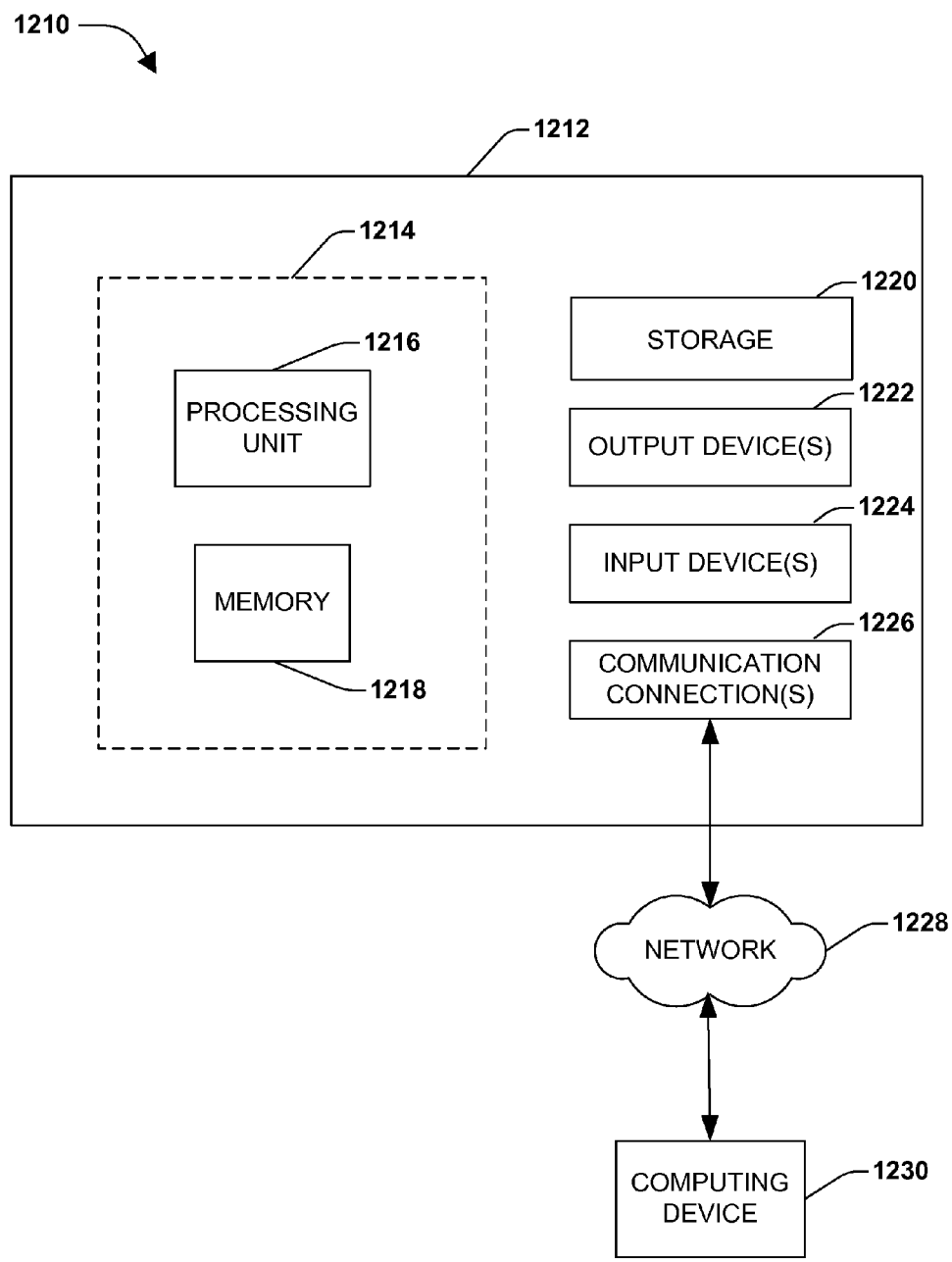
FIG. 12 illustrates an exemplary computing environment wherein one or more of the provisions set forth herein may be implemented.

FIG. 12 and the following discussion provide a brief, general description of a suitable computing environment to implement embodiments of one or more of the provisions set forth herein. The operating environment of FIG. 12 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 12 illustrates an example of a system 1210 comprising a computing device 1212 configured to implement one or more embodiments provided herein. In one configuration, computing device 1212 includes at least one processing unit 1216 and memory 1218. Depending on the exact configuration and type of computing device, memory 1218 may be volatile (such as RAM, for example), non-volatile (such as ROM, flash memory, etc., for example) or some combination of the two. This configuration is illustrated in FIG. 12 by dashed line 1214.

In other embodiments, device 1212 may include additional features and/or functionality. For example, device 1212 may also include additional storage (e.g., removable and/or non-removable) including, but not limited to, magnetic storage, optical storage, and the like. Such additional storage is illustrated in FIG. 12 by storage 1220. In one embodiment, computer readable instructions to implement one or more embodiments provided herein may be in storage 1220. Storage 1220 may also store other computer readable instructions to implement an operating system, an application program, and the like. Computer readable instructions may be loaded in memory 1218 for execution by processing unit 1216, for example.

The term "computer readable media" as used herein includes computer storage media. Computer storage media includes volatile and nonvolatile, removable and non-removable media implemented in any method or technology for storage of information such as computer readable instructions or other data. Memory 1218 and storage 1220 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1212. Any such computer storage media may be part of device 1212.

Device 1212 may also include communication connection(s) 1226 that allows device 1212 to communicate with other devices. Communication connection(s) 1226 may include, but is not limited to, a modem, a Network Interface Card (NIC), an integrated network interface, a radio frequency transmitter/receiver, an infrared port, a USB connection, or other interfaces for connecting computing device 1212 to other computing devices. Communication connection(s) 1226 may include a wired connection or a wireless connection. Communication connection(s) 1226 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1212 may include input device(s) 1224 such as keyboard, mouse, pen, voice input device, touch input device, infrared cameras, video input devices, and/or any other input device. Output device(s) 1222 such as one or more displays, speakers, printers, and/or any other output device may also be included in device 1212. Input device(s) 1224 and output device(s) 1222 may be connected to device 1212 via a wired connection, wireless connection, or any combination thereof. In one embodiment, an input device or an output device from another computing device may be used as input device(s) 1224 or output device(s) 1222 for computing device 1212.

Components of computing device 1212 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1212 may be interconnected by a network. For example, memory 1218 may be comprised of multiple physical memory units located in different physical locations interconnected by a network.

Those skilled in the art will realize that storage devices utilized to store computer readable instructions may be distributed across a network. For example, a computing device 1230 accessible via a network 1228 may store computer readable instructions to implement one or more embodiments provided herein. Computing device 1212 may access computing device 1230 and download a part or all of the computer readable instructions for execution. Alternatively, computing device 1212 may download pieces of the computer readable instructions, as needed, or some instructions may be executed at computing device 1212 and some at computing device 1230.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, at least one of A and B and/or the like generally means A or B or both A and B.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for suspending one or more processes associated with an application, comprising:
   receiving a notification that the application is inactive;
   identifying the one or more processes associated with the application which is inactive;
   placing the one or more processes which were identified into a suspend state responsive to the notification that the application is inactive;
   maintaining an application message queue associated with the application;
   placing a first application message into the application message queue while the application is in the suspend state, the first application message received at a first time;
   placing a second application message into the application message queue while the application is in the suspend state, the second application message received at a second time that is later than the first time;
   determining that the second application message renders the first application message as being a stale message; and
   upon resumption of at least one process of the one or more processes associated with the application, refraining from providing the first application message based on determining that the first application message is the stale message.

2. The method of claim 1, comprising:
   determining that the application is inactive based upon at least one of:
   determining that the application is not visible to a user;
   determining that the application fails to receive user input for at least a predetermined amount of time; or
   determining that the application is in a background state.

3. The method of claim 1, wherein the application is assigned to a root logical container within a logical container hierarchy, and wherein the identifying the one or more processes comprises:
   determining that a first process of the one or more processes is associated with the application based upon determining that the first process is assigned to a first logical container associated with the root logical container.

4. The method of claim 3, comprising:
   determining that the first logical container is nested within the root logical container.

5. The method of claim 3, wherein the identifying the one or more processes comprises:
   determining that a second process of the one or more processes is associated with the application based upon determining that the second process is assigned to a second logical container associated with the first logical container.

6. The method of claim 5, comprising:
   determining that the second process is a child process of the first process based upon determining that the second logical container is nested within the first logical container.

7. The method of claim 3, wherein the identifying the one or more processes comprises:
   determining that a second process is associated with the application based upon determining that the second process is assigned to the first logical container.

8. The method of claim 1, wherein the placing into the suspend state the one or more processes which were identified comprises:
   saving memory content associated with a suspended process of the one or more processes to a data storage.

9. The method of claim 1, further comprising:
   identifying that a new process has been created;
   determining that the new process is associated with at least one of the application which is inactive or the one or more processes which have been placed into the suspend state based upon determining that the new process is assigned to a logical container associated with a root logical container to which the application is assigned; and
   placing the new process into the suspend state.

10. The system method of claim 1, further comprising:
    maintaining a timer associated with at least one process of the one or more processes associated with the application;
    determining, upon the at least one process of the one or more processes being placed in to the suspend state, rebasing data of the timer;
    resuming the at least one process based at least on a wake policy associated with the application; and
    resuming the timer, upon the at least one process resuming, based at least on the rebasing data.

11. The method of claim 10, wherein the timer comprises a relative timer, and wherein the rebasing data comprises a time till expiration value indicating a time span from when the relative timer is suspended to an original expiration time of the relative timer.

12. The method of claim 10, wherein the timer comprises an absolute timer, and wherein the rebasing data comprises an original expiration time of the absolute timer.

13. The method of claim 1, further comprising removing the first application message from the application message queue in response to determining the first application message is the stale message.

14. The method of claim 1, further comprising maintaining the one or more processes in the suspend state based on a wake policy that applies to a logical container hierarchy that is associated with the application.

15. One of a solid state storage device, an optical disk or a magnetic storage device comprising computer-executable instructions that are executable by one or more processors of a computing system to perform acts comprising:
receiving a notification that an application is inactive;
iteratively traversing a logical container hierarchy to identify one or more processes associated with the application which is inactive;
placing the one or more processes which were identified into a suspend state responsive to the notification that the application is inactive;
maintaining a timer associated with at least one process of the one or more processes associated with the application;
determining, upon the at least one process of the one or more processes being placed in to the suspend state, rebasing data of the timer;
resuming the at least one process based at least on a wake policy associated with the application; and
resuming the timer, upon the at least one process resuming, based at least on the rebasing data.

16. The solid state storage device, optical disk or magnetic storage device of claim 15, wherein the iteratively traversing the logical container hierarchy comprises:
determining that the application is assigned to a root logical container;
determining that a first process of the one or more processes is associated with the application based upon determining that the first process is assigned to a first logical container associated with the root logical container; and
determining that a second process is associated with the application based upon determining that the second process of the one or more processes is assigned to a second logical container associated with the first logical container.

17. The solid state storage device, optical disk or magnetic storage device of claim 15, wherein the iteratively traversing the logical container hierarchy comprises:
determining that the application is assigned to a root logical container;
determining that a first process of the one or more processes is associated with the application based upon determining that the first process is assigned to a first logical container associated with the root logical container; and
determining that a second process of the one or more processes is associated with the application based upon determining that the second process is assigned to the first logical container.

18. The solid state storage device, optical disk or magnetic storage device of claim 15, the instructions further executable to perform acts comprising:
identifying that a new process has been created;
determining that the new process is associated with at least one of the application which is inactive or the one or more processes which have been placed into the suspend state based upon determining that the new process is assigned to a logical container associated with a root logical container to which the application is assigned; and
placing the new process into the suspend state.

19. The solid state storage device, optical disk or magnetic storage device of claim 15, wherein the wake policy applies to a logical container hierarchy that is associated with the application.

20. The solid state storage device, the optical disk, or the magnetic storage device of claim 15, wherein the timer comprises a relative timer, and wherein the rebasing data comprises a time till expiration value indicating a time span from when the relative timer is suspended to an original expiration time of the relative timer.

21. The solid state storage device, the optical disk, or the magnetic storage device of claim 15, wherein the timer comprises an absolute timer, and wherein the rebasing data comprises an original expiration time of the absolute timer.

22. A system for suspending one or more processes associated with an application, comprising:
one or more processing units; and
memory comprising instructions that are executable by at least one of the one or more processing units to:
receive a notification that the application is inactive;
iteratively traverse a logical container hierarchy to identify the one or more processes associated with the application which is inactive;
place the one or more processes which were identified into a suspend state responsive to the notification that the application is inactive;
maintain a timer associated with at least one process of the one or more processes associated with the application;
determine, upon the at least one process of the one or more processes being placed in to the suspend state, rebasing data of the timer;
resume the at least one process based at least on a wake policy associated with the application; and
resume the timer, upon the at least one process resuming, based at least on the rebasing data.

23. The system of claim 22, the instructions further executable to:
determine that the application is assigned to a root logical container;
determine that a first process of the one or more processes is associated with the application based upon determining that the first process is assigned to a first logical container associated with the root logical container; and
determine that a second process of the one or more processes is associated with the application based upon determining that the second process is assigned to a second logical container associated with the first logical container.

24. The system of claim 22, the instructions further executable to:
determine that the application is assigned to a root logical container;
determine that a first process of the one or more processes is associated with the application based upon determining that the first process is assigned; and
determine that a second process of the one or more processes is associated with the application based upon determining that the second process is assigned to the first logical container.

25. The system of claim 22, the instructions further executable to:
identify a new process has been created;
determine that the new process is associated with at least one of the application which is inactive or the one or more processes which have been placed into the suspend state based upon determining that the new process is assigned to a logical container associated with a root logical container to which the application is assigned; and
place the new process into the suspend state.

26. The system of claim 22, the instructions further executable to:

maintain an application message queue associated with the application, a plurality of application messages placed into the application message queue while the application is in the suspend state;

place a first application message into the application message queue, the first application message received at a first time;

place a second application message into the application message queue, the second application message received at a second time that is later than the first time;

determine that the second application message renders the first application message irrelevant; and upon resumption of at least one process of the one or more processes associated with the application, refrain from providing the first application message based on determining that the first application message is irrelevant.

27. The system of claim 26, the instructions further executable to remove the first application message from the application message queue in response to determining the first application message is the stale message.

28. The system of claim 22, wherein the timer comprises a relative timer, and wherein the rebasing data comprises a time till expiration value indicating a time span from when the relative timer is suspended to an original expiration time of the relative timer.

29. The system of claim 22, wherein the timer comprises an absolute timer, and wherein the rebasing data comprises an original expiration time of the absolute timer.

30. The system of claim 22, wherein the wake policy applies to a logical container hierarchy that is associated with the application.

* * * * *